(12) United States Patent
Palapudi et al.

(10) Patent No.: US 7,415,489 B2
(45) Date of Patent: Aug. 19, 2008

(54) MANAGING AN ARCHIVED FILE SYSTEM

(75) Inventors: Sriram Palapudi, Santa Clara, CA (US);
Maria Savarimuthu Rajakannimariyan, San Jose, CA (US);
Rainer Wolafka, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/328,581

(22) Filed: Jan. 10, 2006

(65) Prior Publication Data

US 2007/0174366 A1 Jul. 26, 2007

(51) Int. Cl.
*G06F 17/30* (2006.01)

(52) U.S. Cl. .......................... 707/203; 707/10
(58) Field of Classification Search ................ 707/204, 707/205, 10, 203
See application file for complete search history.

(56) References Cited

U.S. PATENT DOCUMENTS

| | | | |
|---|---|---|---|
| 5,530,899 A * | 6/1996 | MacDonald ................. | 710/17 |
| 5,566,331 A | 10/1996 | Irwin et al. | |
| 5,875,478 A * | 2/1999 | Blumenau ................... | 711/162 |
| 5,907,703 A * | 5/1999 | Kronenberg et al. ........ | 719/321 |
| 5,991,753 A * | 11/1999 | Wilde ........................... | 707/2 |
| 6,125,402 A | 9/2000 | Nagarajayya et al. | |
| 6,266,679 B1 * | 7/2001 | Szalwinski et al. .......... | 707/204 |
| 6,557,039 B1 | 4/2003 | Leong et al. | |
| 7,155,445 B1 * | 12/2006 | Kling et al. ................. | 707/101 |
| 2002/0029228 A1 * | 3/2002 | Rodriguez et al. .......... | 707/204 |
| 2002/0178439 A1 * | 11/2002 | Rich et al. ................... | 717/174 |
| 2003/0191849 A1 | 10/2003 | Leong et al. | |
| 2003/0195864 A1 | 10/2003 | Vishlitzky et al. | |
| 2004/0064832 A1 | 4/2004 | Tsukidate et al. | |
| 2004/0122872 A1 * | 6/2004 | Pandya et al. ............... | 707/204 |
| 2005/0071383 A1 | 3/2005 | Herbst et al. | |

* cited by examiner

*Primary Examiner*—Mohammad Ali
*Assistant Examiner*—Mohammed R Uddin
(74) *Attorney, Agent, or Firm*—Rabindranath Dutta; Konrad Raynes & Victor LLP

(57) ABSTRACT

A determination is made that an archive that includes at least one file is present in association with an operating system file system. An additional file system is generated for accessing the archive. The generated additional file system is included in the operating system file system. An application is allowed to access the at least one file via the generated additional file system.

6 Claims, 7 Drawing Sheets

MANAGING AN ARCHIVED FILE SYSTEM

BACKGROUND

1. Field

The disclosure relates to a method, system, and article of manufacture for managing an archived file system.

2. Background

A file archiver is an application that may combine one or more files into one archive file, or a series of archive files. Many file archivers use data compression in order to reduce the size of the archive file. Certain file archivers take a plurality of files and concatenate the contents of the plurality of files sequentially into the archive file. The process of generating an archive file may be termed archiving or packing. Reconstructing the original files from an archive file may be termed unarchiving, unpacking or extracting.

One or more files or directories may be compressed and stored in an archive. The archive may have to be decompressed before an application can access the files or directories that are compressed and stored in the archived. For example, in certain versions of the Unix operating system the "tape archive" (TAR) file format may be used. On certain Windows platforms, the ZIP archive format may be used to archive files.

Different archiving software may use different compression and decompression algorithms, and may also use different encryption and decryption mechanisms to restrict access to the files or directories stored in the archive. In addition, different archiving software may provide different interfaces to add files to an archive, and to extract and access the files from the archive.

If an application needs to access files or directories that have been stored in an archive, the archive may have to be uncompressed and/or unarchived by the archiving software before the application can access the files or the directories. The archive file cannot be directly used by the application or by operating system commands for manipulating files or directories, such as, commands for copying files, listing the files in a directory, etc.

SUMMARY OF THE DESCRIBED EMBODIMENTS

Provided are a method, system, and article of manufacture, wherein a determination is made that an archive that includes at least one file is present in association with an operating system file system. An additional file system is generated for accessing the archive. The generated additional file system is included in the operating system file system. An application is allowed to access the at least one file via the generated additional file system.

In additional embodiments, the additional file system is a virtual archives file system. The archive is decompressed via a decompression module of an archive processing module corresponding to the archive, wherein decompressing the archive generates the at least one file. The at least one file is exposed to the application, via at least one interface provided by the virtual archives file system.

In yet additional embodiments, the virtual archives file system is mounted to a directory. The at least one file is stored in the directory to expose the at least one file to the application. The application accesses the directory to perform an operation on the at least one file.

In further embodiments, the additional file system receives a request from the application to access the at least one file. The additional file system provides the at least one file to the application, wherein the at least one file has already been stored in the additional file system via a decompression of the archive, and wherein the decompression of the archive occurs before receiving the request to access the at least one file.

In yet further embodiments, the additional file system is accessible to the application via an Input/Output (I/O) manager provided by an operating system that supports that operating system file system, and wherein the additional file system allows at least read and write operations on the at least one file via the I/O manager.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. For example, while the following description describes embodiments with reference to a backup of data, it is understood that alternative embodiments may be utilized for archiving of data, migration of data, etc.

Certain embodiments provide a file system that virtualizes archives as an operating system file system, such that applications like Web servers, File Transmission Protocol (FTP) servers, and operating system commands can access the files in they archives directly by using the operating system provided I/O system calls.

Figure 1:
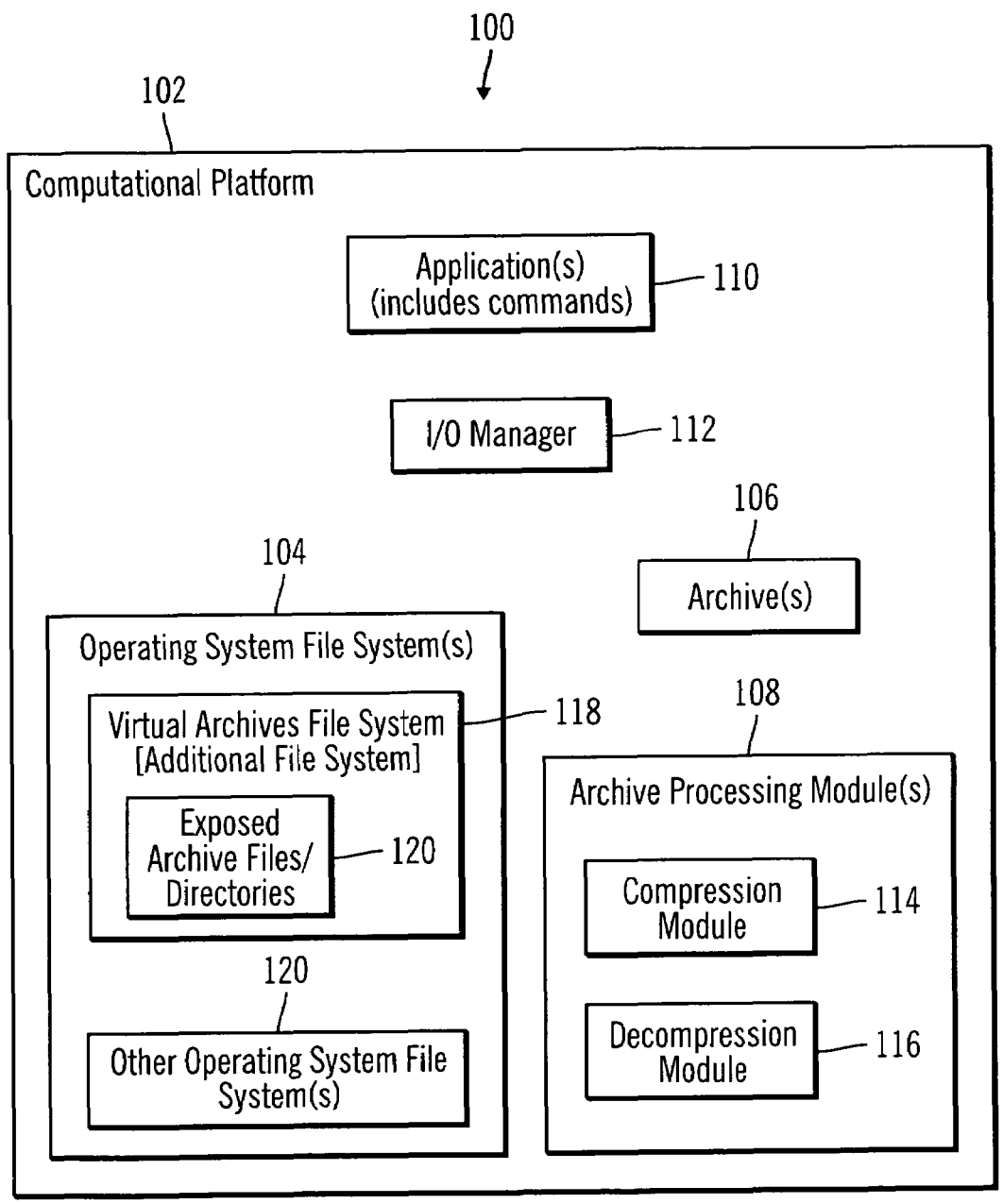
FIG. 1 illustrates a block diagram of a computing environment in accordance with certain embodiments.

FIG. 1 illustrates a block diagram of a computing environment 100 in accordance with certain embodiments. The computational environment 100 includes a computational platform 102 that may comprise any suitable computational platform, including those presently known in the art, such as, personal computers, workstations, mainframes, midrange computers, network appliances, palm top computers, telephony devices, blade computers, hand held computers, etc. While the computational platform 102 has not been shown coupled to a network, in certain embodiments the computational platform 102 may be coupled to a network, such as, the Internet, an intranet, a storage area network, a wide area network, a local area network, etc.

The computational platform 102 includes one or more operating system file systems 104, one or more archives 106, at least one archive processing module 108, one or more applications 110, and an I/O manager 112.

The operating system file system 104 includes any suitable operating system file system, including those presently known in the art, such as the Network File System (NFS), the File Allocation Table (FAT) file system, the Journal File System (JFS), New Technology File System (NTFS), etc. The operating system file systems 104 included in the computational platform 102 may be supported by the operating system (not shown) that executes on the computational platform 102.

The archive 106 may include, any suitable archive, including those presently known in the art, such as a ZIP archive, a Java Archive (JAR), a Tape Archive (TAR), a GZIP archive, etc. The archive 106 may include one or more files that may have undergone compression before archiving.

The archive processing module 108, also referred to as a file archiver, may include a compression module 114 and a decompression module 116. The compression module 114 may compress files that are to be archived in the archive 106. For example, a ZIP compression module may compress a plurality of files and store the resulting ZIP archive in the archive 106. The decompression module 116 may decompress the files stored in the archive 106. For example, the decompression module 116 may decompress compressed files stored in a ZIP archive. While embodiments will be illustrated with compression and decompression of archives, alternative embodiments may utilize the packing and unpacking of archives, in addition to or instead of the compression and decompression of archives.

The application 110 may include any suitable application or command, including those presently known in the art, that are capable of interfacing with the operating system file system 104 via the I/O manager 112, where the I/O manager 112 may be provided by the operating system that executes in the computational platform 102. The I/O manager 112 allows the application 110 to perform I/O on unarchived files stored in the operating system file system 104.

In certain embodiments, the operating system file system 104 includes a virtual archives file system 118 in addition to other operating system file systems 120, such as, NFS, JFS, FAT, NTFS, etc. The virtual archives file system 118 allows the application 110 to access the files stored in the archive 106 without any decompression by using the exposed files and directories 120 generated by the virtual archives file system 118.

Therefore, FIG. 1 illustrates a virtual archives file system 118 that that virtualizes the archives 106 as an operating system file system 104, such that applications 114 like Web servers, File Transmission Protocol (FTP) servers, and other operating system commands can access the files in archives 106 directly by using the operating system provided I/O system calls in the I/O manager 112.

Figure 2:
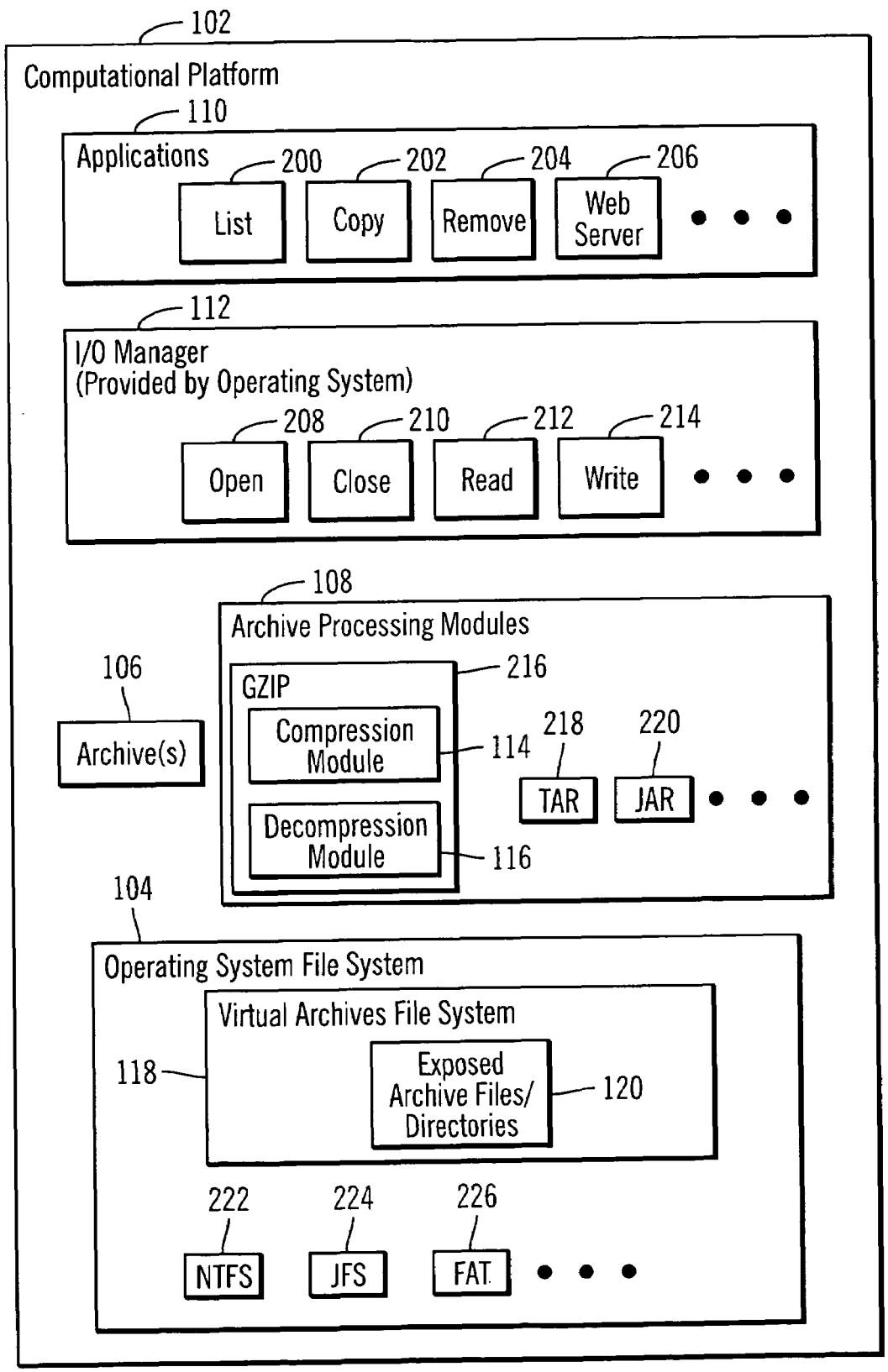
FIG. 2 illustrates a block diagram that includes additional elements included in the computing environment of FIG. 1, in accordance with certain embodiments.

FIG. 2 illustrates a block diagram that includes additional elements included in the computing environment 100 of FIG. 1, in accordance with certain embodiments.

The applications 110 included in the computational platform 102 of the computing environment 100 may include applications, such as a list command 200, a copy command 202, a remove command 204, a Web server 206 application, etc., where the list command 200 lists the files in a directory, where the copy command 202 copies a file from one location to another, where the remove command 204 removes a file from a directory, and where the Web server 206 application may attempt to perform I/O with files stored in the computational platform 102.

The I/O manager 112 may include various I/O system calls, such as open 208, close 210, read 212, write 214, where the open system call 208 opens a file, the close system call 210 closes a file, the read system call 212 reads from a file, and the write system call writes to a file. Applications 110, such as the Web server 206, may use the I/O system calls in the I/O manager 112 to access the files stored in the computational platform 102.

The archive processing module 108 may include a GZIP utility 216, a TAR utility 218, and a JAR utility 220, where the GZIP utility 216 may create archives in the GZIP format, the TAR utility 218 may create archives in the TAR format, and the JAR utility 220 may create archives in the JAR format.

The operating system file system 104 may include file systems such as NTFS 222, JFS 224, FAT 226, etc., in addition to the virtual archives file system 118. The virtual archives file system 118 includes exposed archive files and directories 118, where the exposed archive files and directories 118 are used by the applications 110 to access the files in the archive 106, where the archive 106 stores archived files in formats such as GZIP, JAR, TAR, etc. However, the applications 110 do not have to execute the archive processing modules 108 to access the archived files stored in the archive 106, but instead access the archived files directly via the exposed files and directories 120 of the virtual archives file system 118.

Figure 3:
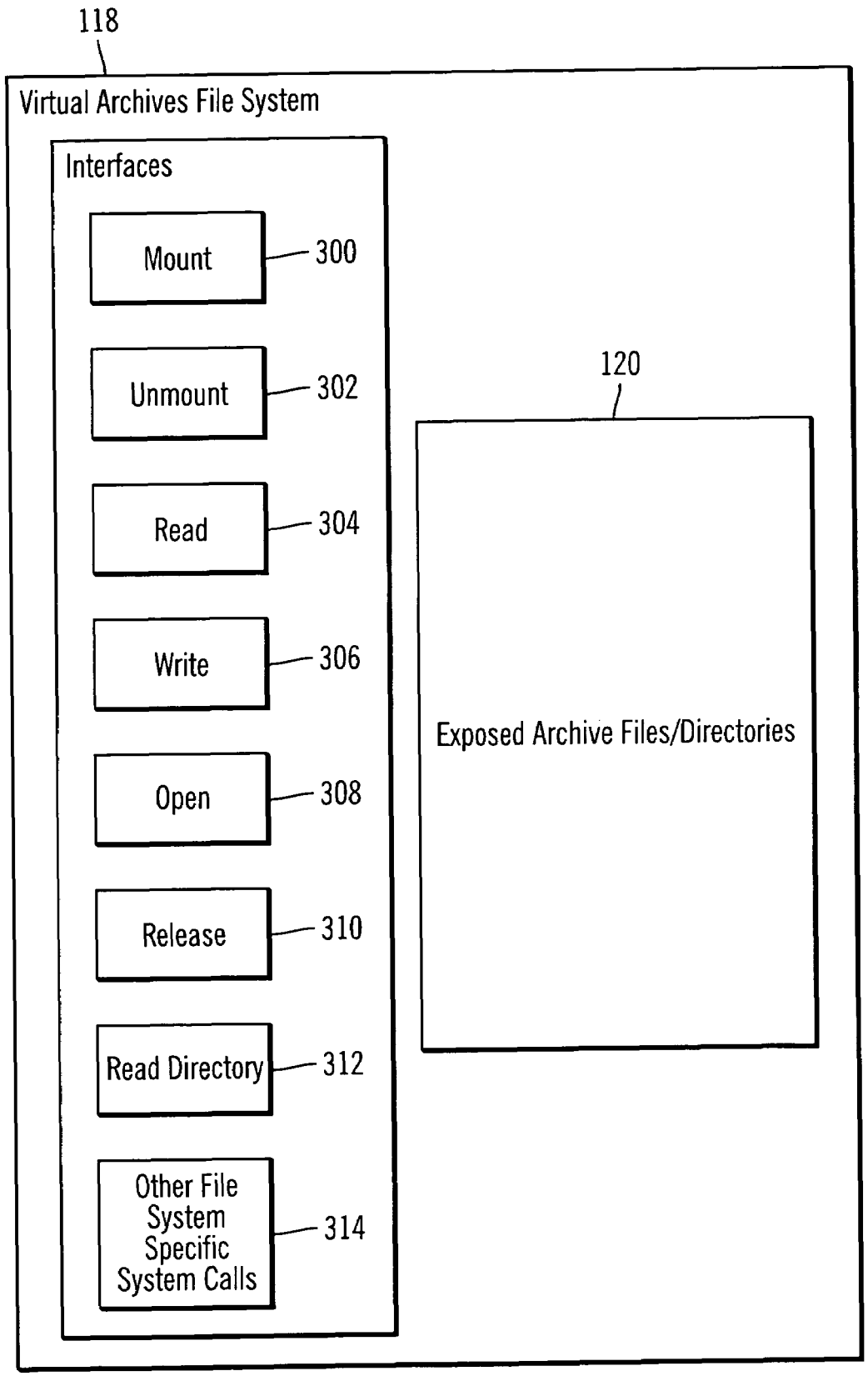
FIG. 3 illustrates a block diagram of a virtual archives file system, in accordance with certain embodiments.

FIG. 3 illustrates a block diagram of the virtual archives file system 118, in accordance with certain embodiments.

The virtual archives file system 118 may be implemented as one of the kernel modules of the operating system file system. The virtual archives file system 118 implements the kernel file system specific system calls such as mount 300, unmount 302, read 304, write 306, open 308, release 310, read directory 312, and other file system specific calls 314. For example, the mount command 300 may carry the archive file as one of the arguments to the virtual archives file system 118 and may mount the virtual archives file system 118 into a specified file directory on which the files and the directories of the archive would be laid like other files and directories.

Figure 4:
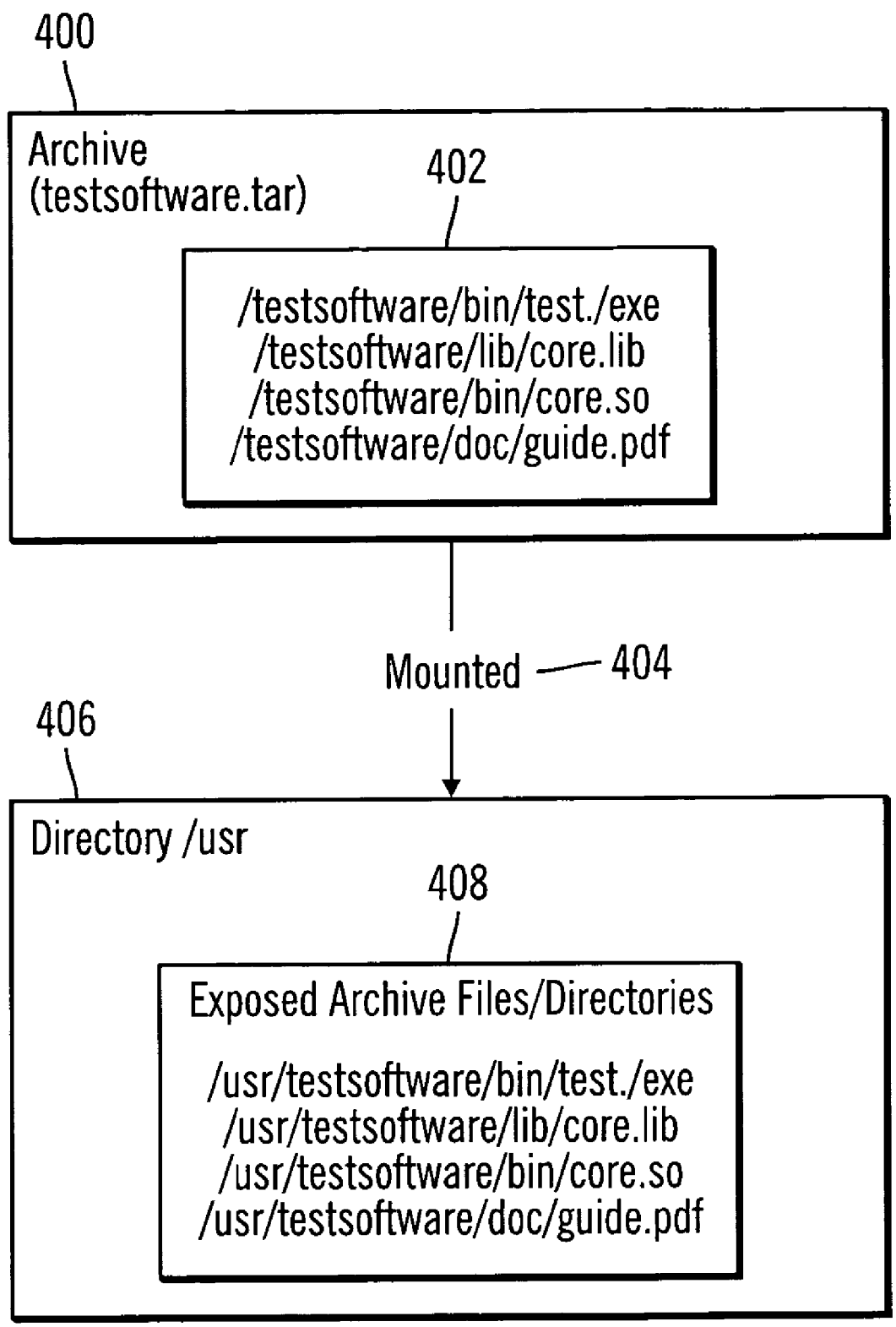
FIG. 4 illustrates a block diagram that shows an exemplary archive and the corresponding files/directories exposed by the virtual archives file system, in accordance with certain embodiments.

FIG. 4 illustrates a block diagram that shows an exemplary archive and the corresponding files/directories exposed by the virtual archives file system 118, in accordance with certain embodiments.

In FIG. 4, an exemplary archive 400 named "testsoftware.tar" includes the following files 402:
/testsoftware/bin/test./exe
/testsoftware/lib/core.lib
/testsoftware/bin/core.so
/testsoftware/doc/guide.pdf.

When the archive "testsoftware.tar" is mounted 404 as a virtual archives file system 118 to the directory /usr 406, then the application 110 will have access to the exposed files and directories 408 as follows:
/usr/testsoftware/bin/test.exe
/usr/testsoftware/lib/core.lib
/usr/testsoftware/bin/core.so
/usr/testsoftware/doc/guide.pdf.

In certain embodiments, if a user types the command 'ls' in the korn shell, the user would see 'testsoftware' as one of the directories under /usr, and similarly 'bin', 'lib', and 'doc' would be seen as directories under /usr/testsoftware. An editor command would be able to open the file guide.pdf by using any of the editing applications included in the applications 110. Similarly text.exe can be executed from the directory /usr/testsofware/bin and supporting files can be loaded directly by the operating system loader.

Therefore, FIG. 4 illustrates certain embodiments in which even though a plurality of files are stored in an archive, the plurality of files can be individually accessed directly by the applications 110 by using the exposed archive files and directories 120 stored in the virtual archives file system 118. The virtual archives file system 118 uses the other operating system file systems 120, such as JFS, NFS, FAT, etc., to read the actual archives and different compression modules 114 and decompression modules 116 to handle the different types of archives. The virtual archives file system 118 loads the archives from the storage using the associated file system when the virtual archives file system 118 is mounted to a directory. The virtual archives file system 118 may also call the decompression module 116 corresponding to an archive, when the virtual archives file system 118 receives a read system call from the application 110. Additionally, the virtual archives file system 118 may call the compression module 114 corresponding to an archive, when the virtual archives file system 118 receives a write system call from the application 110.

Therefore, FIG. 4 illustrates certain embodiments in which in response to the mounting of the virtual archives file system 118, the exposed archive files and directories 408 allow the applications 110 to directly access the archived files without any archive processing modules 108 being called by the applications 110.

Figure 5:
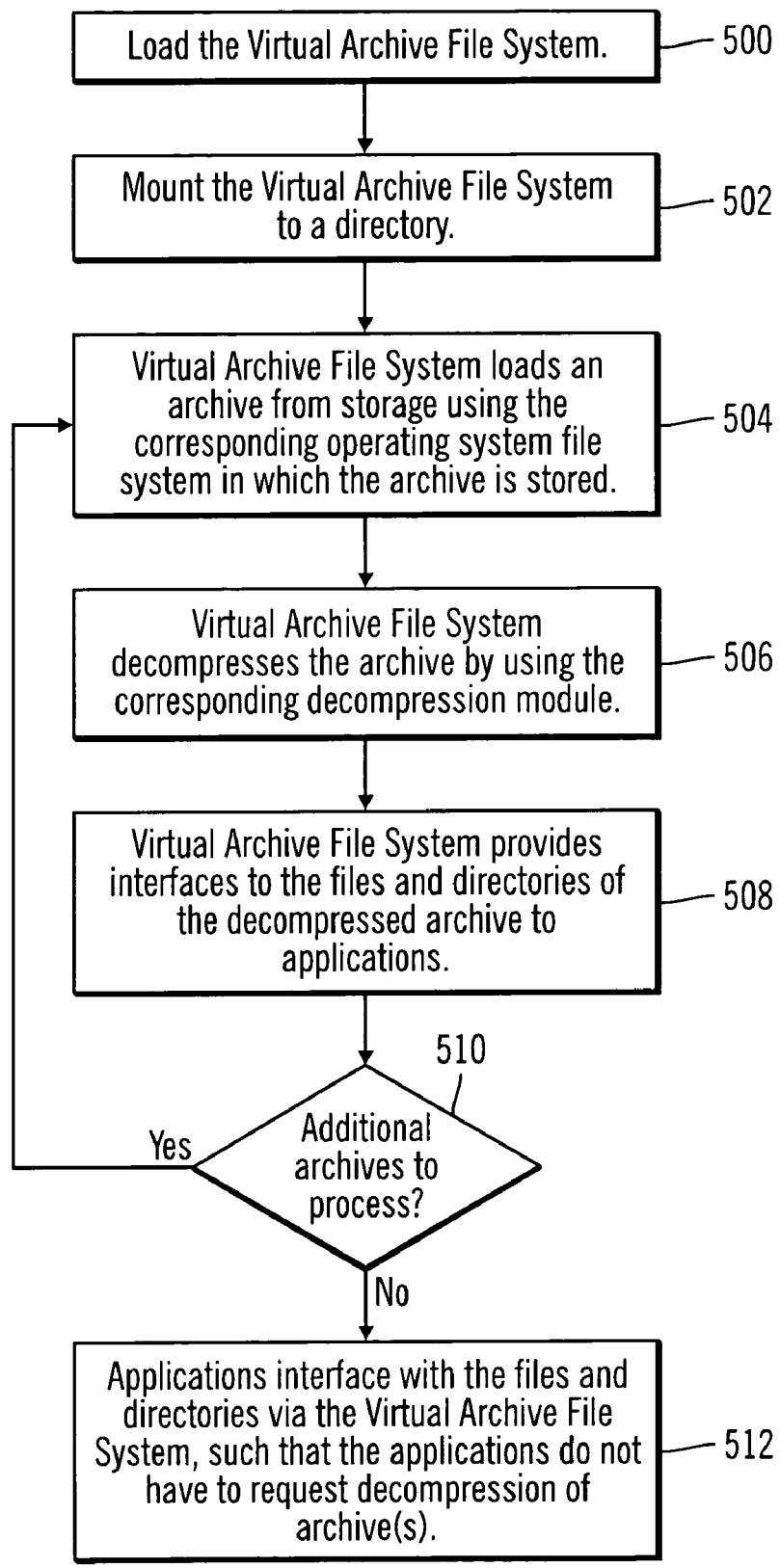
FIG. 5 illustrates a first flowchart for managing archived files, in accordance with certain embodiments.

FIG. 5 illustrates a first flowchart for managing archived files in the computing environment 100, in accordance with certain embodiments. Certain operations shown in the flowchart of FIG. 5 may be implemented in computing platform 102 by the virtual archives file system 118 and by the applications 110.

Control starts at block 500, where the virtual archives file system 118 is loaded in the computational platform 102. The operating system may mount (at block 502) the virtual archives file system 118 into a directory.

On being mounted to a directory, the virtual archives file system 118 may load (at block 504) an archive 106 from storage using the corresponding operating system file system 104 with which the archive 106 is associated. The virtual archives file system 118 decompresses (at block 506) the archive 106 by using the corresponding decompression module 116.

Subsequently, the virtual archives file system 118 may provide (at block 508) interfaces to the files and directories of the decompressed archive to applications 110 via the exposed archive files and directories 120 generated by the virtual archives file system 118.

The virtual archives file system 118 determines (at block 510) whether there are additional archives to process. If so, control returns to block 504. If not, applications 110 interface (at block 512) with the files and directories of the archive 106 via the virtual archives file system 118, such that the applications 110 do not have to request decompression or unarchiving of the archives 106.

Therefore, FIG. 5 illustrates certain environments in which a virtual archives file system 118 exposes archived files, such that the archived files can be accessed without decompression or unarchiving being requested by the user applications 110.

Figure 6:
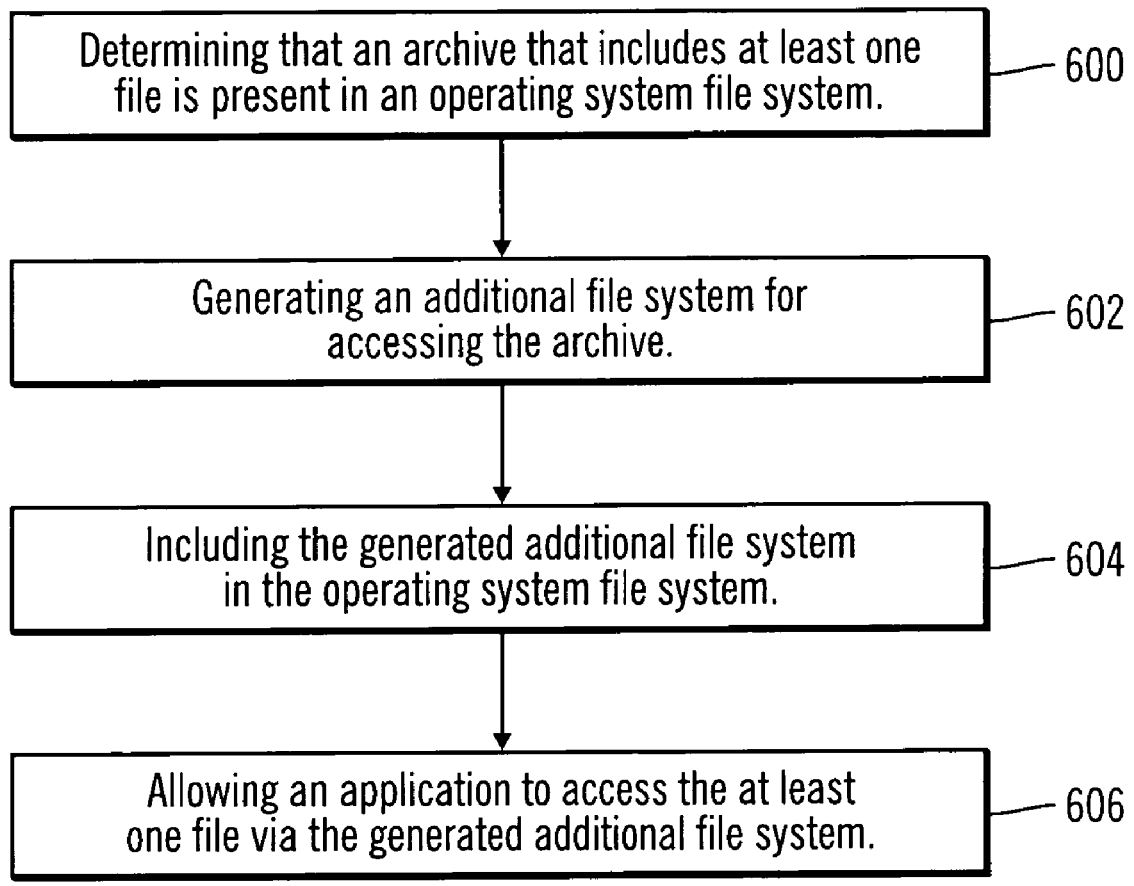
FIG. 6 illustrates a second flowchart for managing archived files, in accordance with certain embodiments.

FIG. 6 illustrates a second flowchart for managing archived files implemented n the computing environment 100, in accordance with certain embodiments.

Control starts at block 600, where it is determined that an archive 106 that includes at least one file is present in association with an operating system file system 104. An additional file system is generated (at block 602) for accessing the archive, where the additional file system may include the virtual archives file system 118.

Control proceeds to block 604, where the generated additional file system 118 is included in the operating system file system 104. An application 110 is allowed (at block 606) to access the at least one file via the generated additional file system 118.

Therefore, FIGS. 1-6 illustrate certain embodiments that provide a virtual archives file system 118 that uses the archive 106 as a storage device and virtualizes the archive 106 as a file system to user applications 110. The user applications 110 can perform different kinds of I/O operations, such as open, close, write, delete, list, etc., over the archive without decomposing the archive. The user applications 110 directly accesse the archives 106 using I/O system calls because the archives are virtualized as an operating system file system to the user applications 110.

For example, Web sites managed by a user mode Web server application can be archived using a compression utility and stored in secondary devices such as a digital video disc (DVD). The archived Web sites can be directly accessed from the archives without decomposing the archive, just as the Web site was accessed before compression.

Therefore, certain embodiments provide a virtual archives file system 118 that allows archived contents to be accessed as files and directories using the standard I/O interfaces provided by the operating system. Disk space may be saved because users may create a file system and assign the file system to one or more archives that are mounted to the virtual archives file system 118, where the virtual archives file system 118 virtualizes the archives as an operating system file system.

Additionally, if the virtual archives file system 118 is mounted, the operating system loader can load the executable modules from the archives directly into memory and execute the modules.

ADDTIONAL EMBOMBODIMENT DETAILS

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
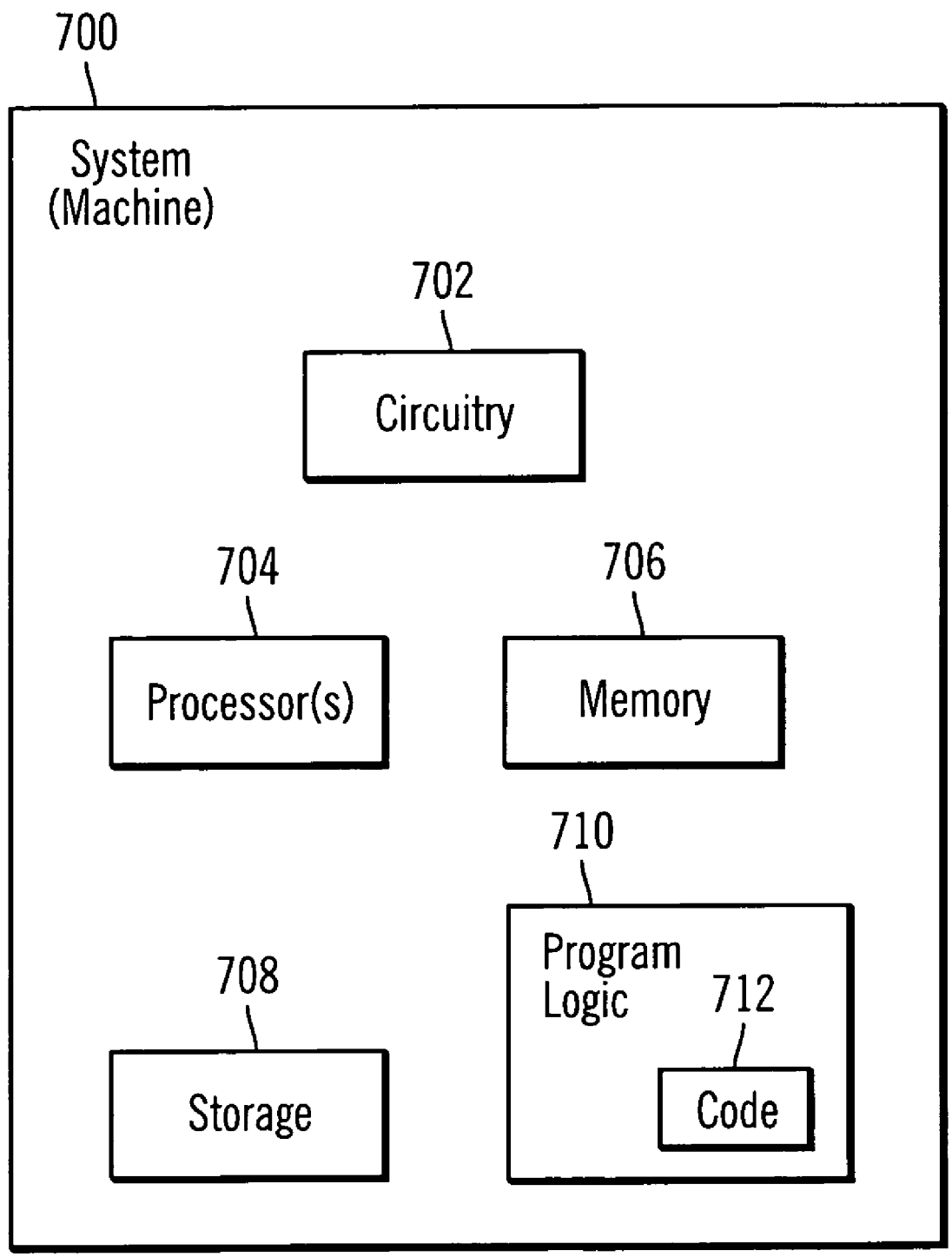
FIG. 7 illustrates an architecture of a computing system, wherein in certain embodiments the computing environment of FIG. 1 may be implemented in accordance with the architecture of the computing system.

FIG. 7 illustrates an exemplary computer system 700, wherein in certain embodiments the computing platform 102 of the computing environment 100 of FIG. 1 may be implemented in accordance with the computer architecture of the computer system 700. The computer system 700 may also be referred to as a system or a machine, and may include a circuitry 702 that may in certain embodiments include a processor 704. The system 700 may also include a memory 706 (e.g., a volatile memory device), and storage 708. Certain elements of the system 700 may or may not be found in the computing platform 102. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 5 and 6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   determining that an archive that includes at least one file is present in association with an operating system file system;
   generating an additional file system for accessing the archive;

including the generated additional file system as a kernel module of a plurality of kernel modules in the operating system file system; and allowing an application to access the at least one file via the generated additional file system, wherein if the generated additional file system is mounted, an operating system loader loads executable modules from the archive directly into memory and executes the executable modules, wherein compression and decompression modules corresponding to the archive are stored outside the operating system file system, and wherein the operating system file system includes other files systems besides the additional file system, wherein the additional file system is a virtual archives file system, the method further comprising:

(a) decompressing the archive via a decompression module of an archive processing module corresponding to the archive, wherein decompressing the archive generates the at least one file; and (b) exposing the at least one file to the application, via at least one interface provided by the virtual archives file system, wherein the virtual archives file system is mounted to a directory, wherein the at least one file is stored in the directory to expose the at least one file to the application, wherein the application accesses the directory to perform an operation on the at least one file, wherein a Web site managed by a user mode Web server application is archived by using a compression utility and stored in a secondary device, and wherein the archived Web site is directly accessed from the archive without decomposing the archive just as the Web site was accessed prior to compression of the Web site.

2. The method of claim 1, further comprising:

receiving, by the additional file system, a request from the application to access the at least one file;

providing, by the additional file system, the at least one file to the application, wherein the at least one file has already been stored in the additional file system via a decompression of the archive, and wherein the decompression of the archive occurs before receiving the request to access the at least one file.

3. The method of claim 1, wherein the additional file system is accessible to the application via an I/O manager provided by an operating system that supports that operating system file system, and wherein the additional file system allows at least read and write operations on the at least one file via the I/O manager.

4. A method for deploying computing infrastructure, comprising integrating computer-readable code from a computer readable storage medium into a computing system, wherein the code in combination with the computing system is capable of performing:

determining that an archive that includes at least one file is present in association with an operating system file system that is included in the computing system;

generating an additional file system for accessing the archive;

including the generated additional file system as a kernel module of a plurality of kernel modules in the operating system file system; and allowing an application to access the at least one file via the generated additional file system, wherein if the generated additional file system is mounted, an operating system loader loads executable modules from the archive directly into memory and executes the executable modules, wherein compression and decompression modules corresponding to the archive are stored outside the operating system file system, and wherein the operating system file system includes other files systems besides the additional file system, wherein the additional file system is a virtual archives file system, wherein the code in combination with the computing system is further capable of performing:

(a) decompressing the archive via a decompression module of an archive processing module corresponding to the archive, wherein decompressing the archive generates the at least one file; and (b) exposing the at least one file to the application, via at least one interface provided by the virtual archives file system, wherein the virtual archives file system is mounted to a directory, wherein the at least one file is stored in the directory to expose the at least one file to the application, wherein the application accesses the directory to perform an operation on the at least one file, wherein a Web site managed by a user mode Web server application is archived by using a compression utility and stored in a secondary device, and wherein the archived Web site is directly accessed from the archive without decomposing the archive just as the Web site was accessed prior to compression of the Web site.

5. The method of claim 4, wherein the code in combination with the computing system is further capable of performing:

receiving, by the additional file system, a request from the application to access the at least one file;

providing, by the additional file system, the at least one file to the application, wherein the at least one file has already been stored in the additional file system via a decompression of the archive, and wherein the decompression of the archive occurs before receiving the request to access the at least one file.

6. The method of claim 4, wherein the additional file system is accessible to the application via an I/O manager provided by an operating system that supports that operating system file system, and wherein the additional file system allows at least read and write operations on the at least one file via the I/O manager.

* * * * *